US010739002B2

(12) United States Patent
Moniz et al.

(10) Patent No.: US 10,739,002 B2
(45) Date of Patent: Aug. 11, 2020

(54) FLUIDIC NOZZLE ASSEMBLY FOR A TURBINE ENGINE

(71) Applicant: General Electric Company, Schenectady, NY (US)

(72) Inventors: Thomas Ory Moniz, Loveland, OH (US); Andrei Evulet, Mason, OH (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 15/382,841

(22) Filed: Dec. 19, 2016

(65) Prior Publication Data

US 2018/0172271 A1 Jun. 21, 2018

(51) Int. Cl.
| F02C 7/12 | (2006.01) |
| F23R 3/06 | (2006.01) |
| F23R 3/28 | (2006.01) |
| F01D 5/08 | (2006.01) |

(52) U.S. Cl.
CPC ............... *F23R 3/06* (2013.01); *F01D 5/082* (2013.01); *F02C 7/12* (2013.01); *F23R 3/283* (2013.01); *F23R 3/286* (2013.01); *F23R 2900/03042* (2013.01); *Y02T 50/673* (2013.01); *Y02T 50/676* (2013.01)

(58) Field of Classification Search
CPC ....... F02C 7/18–185; F01D 5/081–084; F01D 9/06; F01D 9/065; F01D 25/12; F01D 25/125
See application file for complete search history.

(56) References Cited

U.S. PATENT DOCUMENTS

| 4,456,427 A | 6/1984 | Evans et al. |
| 4,805,398 A * | 2/1989 | Jourdain ................. F01D 5/082 236/93 R |
| 5,255,505 A | 10/1993 | Cloyd et al. |
| 5,280,703 A | 1/1994 | Corrado et al. |
| 5,581,996 A | 12/1996 | Koch et al. |
| 5,772,400 A | 6/1998 | Pellow |
| 6,050,079 A * | 4/2000 | Durgin ................... F01D 5/082 415/115 |
| 6,336,319 B1 | 1/2002 | Koshoffer |
| 6,749,395 B1 | 6/2004 | Reichert et al. |
| 7,007,488 B2 | 3/2006 | Orlando et al. |
| 7,823,390 B2 * | 11/2010 | Eluripati ................. F01D 11/04 60/39.23 |
| 8,307,662 B2 | 11/2012 | Turco |
| 8,864,466 B2 | 10/2014 | Belmonte et al. |

(Continued)

*Primary Examiner* — Gerald L Sung
*Assistant Examiner* — Rene D Ford
(74) *Attorney, Agent, or Firm* — Dority & Manning, P.A.

(57) ABSTRACT

A gas turbine engine includes a turbine having a stage of turbine rotor blades. The gas turbine engine additionally includes a combustion section defining a cooling air passage for providing a cooling airflow to the stage of turbine rotor blades. The gas turbine engine additionally includes a fluidic nozzle assembly having a fluidic nozzle positioned in or immediately upstream of the cooling air passage of the combustion section. The fluidic nozzle defines an opening and is operable to induce cooling airflow through the opening to increase or decrease an amount of cooling air provided to the stage of turbine rotor blades to, e.g., increase an efficiency of the gas turbine engine.

18 Claims, 5 Drawing Sheets

(56) References Cited

U.S. PATENT DOCUMENTS

| | | | |
|---|---|---|---|
| 2005/0268617 A1* | 12/2005 | Amond | F02C 9/34 |
| | | | 60/776 |
| 2009/0074589 A1* | 3/2009 | Fang | F01D 25/12 |
| | | | 416/97 R |
| 2011/0162387 A1* | 7/2011 | Chir | F01D 5/081 |
| | | | 60/806 |
| 2014/0123657 A1* | 5/2014 | Tham | F01D 5/088 |
| | | | 60/772 |
| 2014/0290254 A1* | 10/2014 | Manning | F01D 9/02 |
| | | | 60/752 |
| 2015/0128598 A1 | 5/2015 | Heinrich et al. | |
| 2016/0201491 A1 | 7/2016 | Surace et al. | |
| 2016/0326963 A1* | 11/2016 | Yamazaki | F01D 25/32 |

* cited by examiner

FLUIDIC NOZZLE ASSEMBLY FOR A TURBINE ENGINE

FIELD

The present subject matter relates generally to a fluidic nozzle assembly for a gas turbine engine.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

During operation of the gas turbine engine, certain components within, e.g., the turbine section may be relatively consistently exposed to elevated temperatures from the combustion gases. In order to maintain a temperature of at least certain of these components below a desired temperature threshold, a cooling airflow may be provided to the components. The cooling airflow is generally provided regardless of an operating mode of the gas turbine engine.

However, depending on the operating mode of the gas turbine engine, the components of the turbine section may or may not need all of the cooling airflow provided thereto. Providing excess cooling airflow to these components may reduce an overall efficiency of the gas turbine engine. Accordingly, a system for managing an amount of cooling airflow provided to one or more component within the turbine section of the gas turbine engine during operation would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a turbine having a stage of turbine rotor blades, a combustion section defining a cooling air passage for providing a cooling airflow to the stage of turbine rotor blades, and a fluidic nozzle assembly. The fluidic nozzle assembly includes a fluidic nozzle positioned in or immediately upstream of the cooling air passage of the combustion section. The fluidic nozzle defines an opening and is operable to induce cooling airflow through the opening.

In another exemplary embodiment of the present disclosure, a fluidic nozzle assembly for a gas turbine engine is provided. The gas turbine engine includes a turbine section having a stage of turbine rotor blades and a combustion section defining a cooling air passage for providing a cooling airflow to the stage of turbine rotor blades. The fluidic nozzle assembly includes a fluidic nozzle configured to be positioned in or immediately upstream of the cooling air passage of the combustion section. The fluidic nozzle defines an opening and a plurality of internal nozzle channels. Each internal nozzle channel defines an internal nozzle outlet positioned around the opening for inducing cooling airflow through the opening during certain operations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
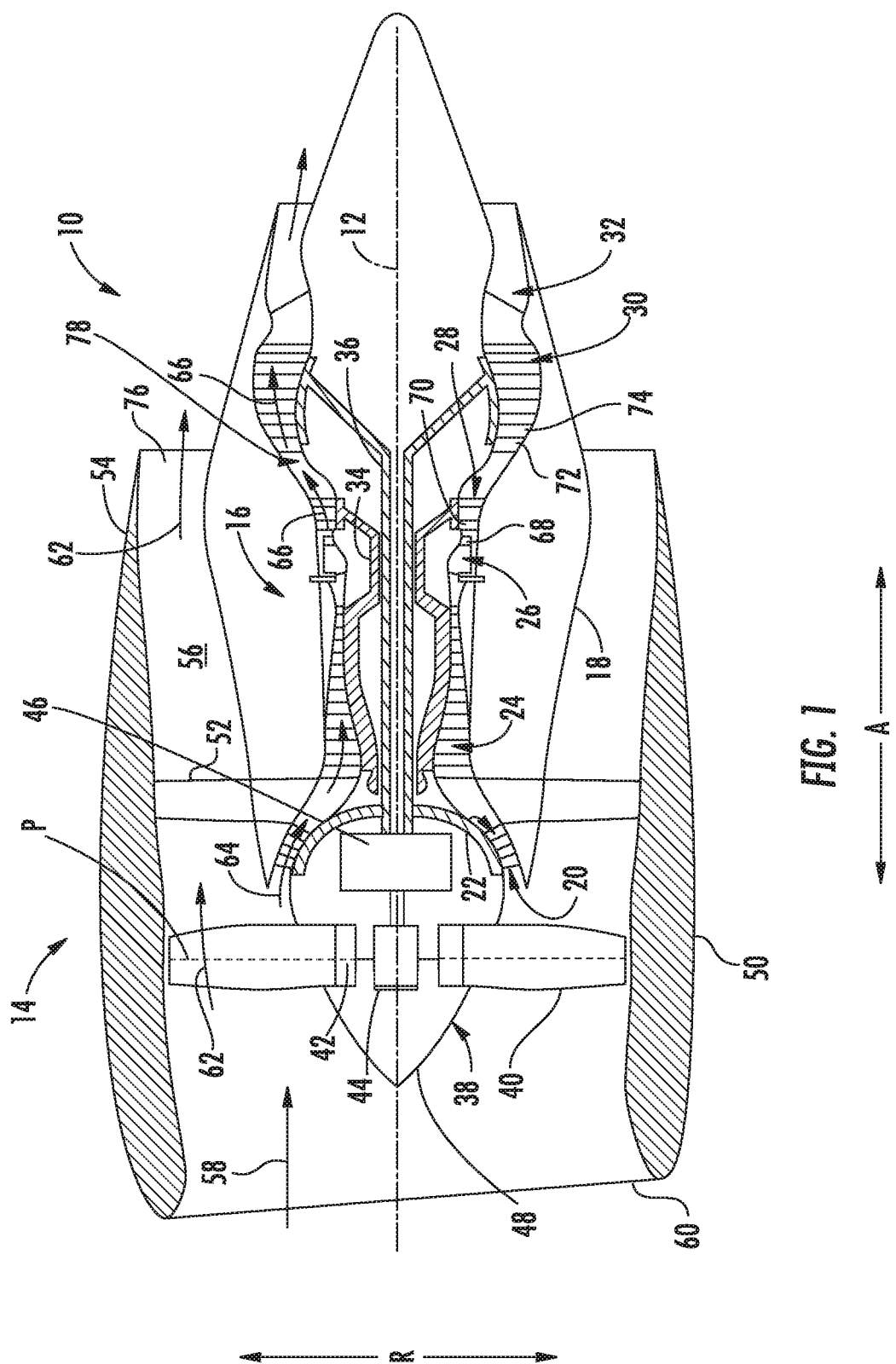
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 6). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may instead be configured as a direct drive turbofan engine 10 (i.e., may not include the power gearbox 46), may include a fixed-pitch fan, etc. Moreover, in other exemplary embodiments, aspects of the present disclosure may instead be utilized with any other suitable aeronautical gas turbine engine, such as a turboshaft engine, turboprop engine, turbojet engine, etc. In still other exemplary embodiments, aspects of the present disclosure may instead be utilized with non-aeronautical gas turbine engines, such as aero derivative engines (e.g., for nautical uses), or industrial gas turbine engines (e.g., for power generation).

Figure 2:
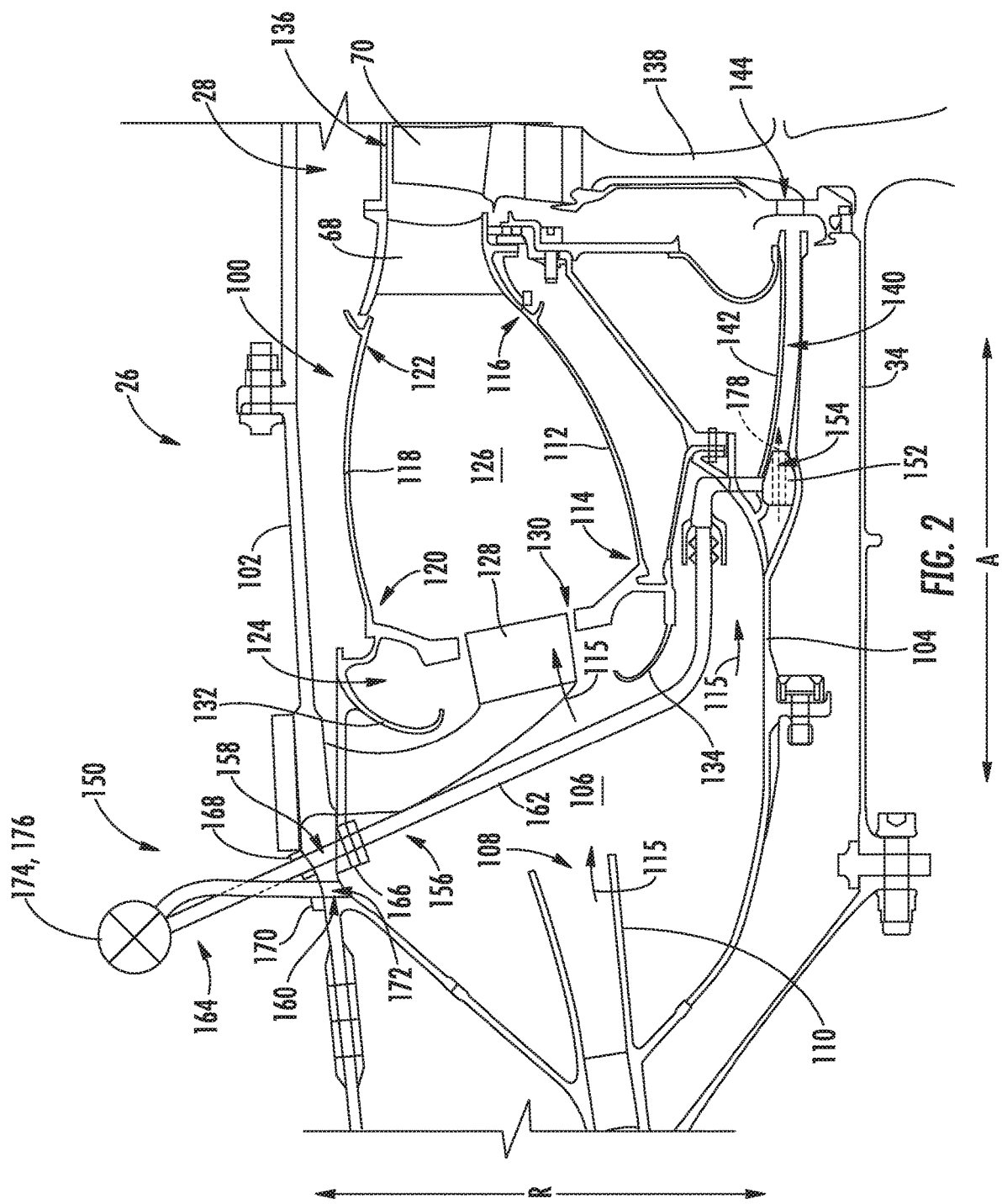
FIG. 2 is a schematic, cross-sectional view of a combustion section of the exemplary gas turbine engine of FIG. 1.

Referring now to FIG. 2, a close-up cross-sectional view is provided of the exemplary combustion section 26 of FIG. 1, including a combustor assembly 100 in accordance with an exemplary embodiment of the present disclosure. As shown, the combustion section 26 generally includes an outer combustor casing 102 and an inner combustor casing 104 spaced from one another along the radial direction R. Each of the inner and outer combustor casings 104, 102 may extend generally along the circumferential direction C of the turbofan engine 10. Between the inner and outer combustor casings 104, 102, the combustion section 26 defines a forward chamber 106 and includes a combustor assembly 100. The forward chamber 106 is generally located forward of, and upstream of, the combustor assembly 100, as is described in greater detail below.

Moreover, the combustion section 26 is in airflow communication with the compressor section. More specifically, the compressor section defines a compressor outlet 108, or rather, a compressor diffuser 110 of the compressor section defines a compressor outlet 108. The forward chamber 106 of the combustion section 26 is in airflow communication with the compressor outlet 108, such that the forward chamber 106 receives a flow of compressor discharge air 115 from the compressor section through the compressor outlet 108.

Additionally, the combustor assembly 100 generally includes an inner liner 112 extending between a forward end 114 and an aft end 116 generally along the axial direction A, as well as an outer liner 118 also extending between a forward end 120 and an aft end 122 generally along the axial direction A. The inner and outer liners 112, 118 together at least partially define a combustion chamber 126 therebetween. Additionally, the inner and outer liners 112, 118 are each attached to an annular dome 124. More particularly, the annular dome 124 is attached to the forward end 114 of the inner liner 112 and to the forward end 120 of the outer liner 118. The dome 124 may be formed integrally (or alternatively may be formed of a plurality of components attached in any suitable manner) and may extend generally along the circumferential direction C to define an annular shape.

The combustor assembly 100 further includes a plurality of fuel air mixers 128 spaced along a circumferential direction C and positioned at least partially within the annular dome 124. More particularly, the plurality of fuel air mixers 128 extend at least partially to or through an opening 130 defined in the annular dome 124. A portion of the flow of compressor discharge air 115 received in the forward chamber 106 from the compressor section flows into or through the fuel air mixers 128, where the air is mixed with fuel and ignited to create the combustion gases 66 within the combustion chamber 126. Accordingly, the forward chamber 106 is located upstream of the combustion chamber 126.

Notably, the annular dome 124 is configured to assist in providing such a flow of compressed air from the compressor section into or through the fuel air mixers 128. For example, the annular dome 124 includes an outer cowl 132 and an inner cowl 134 at a forward end. The outer cowl 132 and inner cowl 134 may assist in directing the flow of compressed air from the compressor section 26 into or through one or more of the fuel air mixers 128.

As is discussed above, the combustion gases 66 flow from the combustion chamber 126 into and through the turbine section of the turbofan engine 10 where a portion of thermal and/or kinetic energy from the combustion gases 66 is extracted via sequential stages of turbine stator vanes and turbine rotor blades. For example, a first stage 136 of turbine rotor blades 70 of the HP turbine 28 of the turbofan engine 10 is depicted in FIG. 2, each of which attached to a first stage rotor 138 of the HP turbine 28. During operation of the turbofan engine 10, the combustion gases 66 flowing over the first stage 136 of turbine rotor blades 70 of the HP turbine 28 may heat such components. In order to maintain a temperature of such components below a desired temperature threshold, the turbofan engine 10 includes a cooling system for providing a flow of cooling air to a certain components within the turbine section, including for the embodiment depicted, the first stage 136 of turbine rotor blades 70 of the HP turbine 28.

More specifically, the exemplary combustion section 26 depicted defines a cooling air passage 140 for providing a cooling airflow to the first stage 136 of turbine rotor blades 70 of the HP turbine 28. For the embodiment depicted, the combustion section 26 further comprises a cooling air inducer 142 (i.e., for the embodiment depicted a tangential inducer for turning the air to match a speed and direction of a hole 144 in the rotor 138, see below), with the cooling air passage 140 being a substantially annular passage defined by the cooling air inducer 142. Further, the cooling air inducer 142 is, for the embodiment depicted, located inward of the combustion chamber 126 along the radial direction R of the turbofan engine 10, and is attached to or formed integrally with the inner combustor casing 104 of the combustion section 26.

During operation of the turbofan engine 10, a portion of the compressor discharge air 115 received in the forward chamber 106 from the outlet 108 of the compressor section may be provided through the cooling air inducer 142 to an opening 144 defined in the first stage rotor 138 of the HP turbine 28. The opening 144 in the first stage rotor 138 may be fluidly connected to one or more cooling air passages (not shown) for providing a cooling airflow to the first stage 136 of turbine rotor blades 70. Such a configuration may assist with maintaining the first stage 136 of turbine rotor blades 70 below a temperature threshold for such components. It should be appreciated, however, that in other exemplary embodiments, the cooling air inducer 142 may instead be configured to provide a flow of cooling air to any other stage of turbine rotor blades (see FIG. 1), or alternatively, to other components of the turbofan engine 10.

Depending on an operating condition of the turbofan engine 10, more or less cooling airflow may be desired for the first stage 136 of turbine rotor blades 70, or for other components within the turbine section. For example, depending on, e.g., a turbine inlet temperature, a compressor exit temperature, an operating mode of the turbofan engine 10, a power output of the turbofan engine 10, etc., more or less cooling airflow may be required to maintain certain components, including, e.g., the first stage 136 of turbine rotor blades 70, below a desired temperature threshold. Accordingly, the exemplary turbofan engine 10 depicted further includes a fluidic nozzle assembly 150 for adjusting an amount of airflow that is provided through the cooling air passage 140 defined by the cooling air inducer 142. The fluidic nozzle assembly 150 includes a fluidic nozzle 152 positioned in or immediately upstream of the cooling air passage 140 of the combustion section 26. The fluidic nozzle 152 defines an opening 154 and is operable to induce cooling airflow through the opening 154. It should be appreciated, that as used herein, the term "immediately upstream of", with respect to the cooling air passage 140, refers to being positioned upstream of the cooling air passage 140, such that substantially all of an airflow through the opening 154 of the fluidic nozzle 152 flows through the cooling air passage 140.

Figure 3:
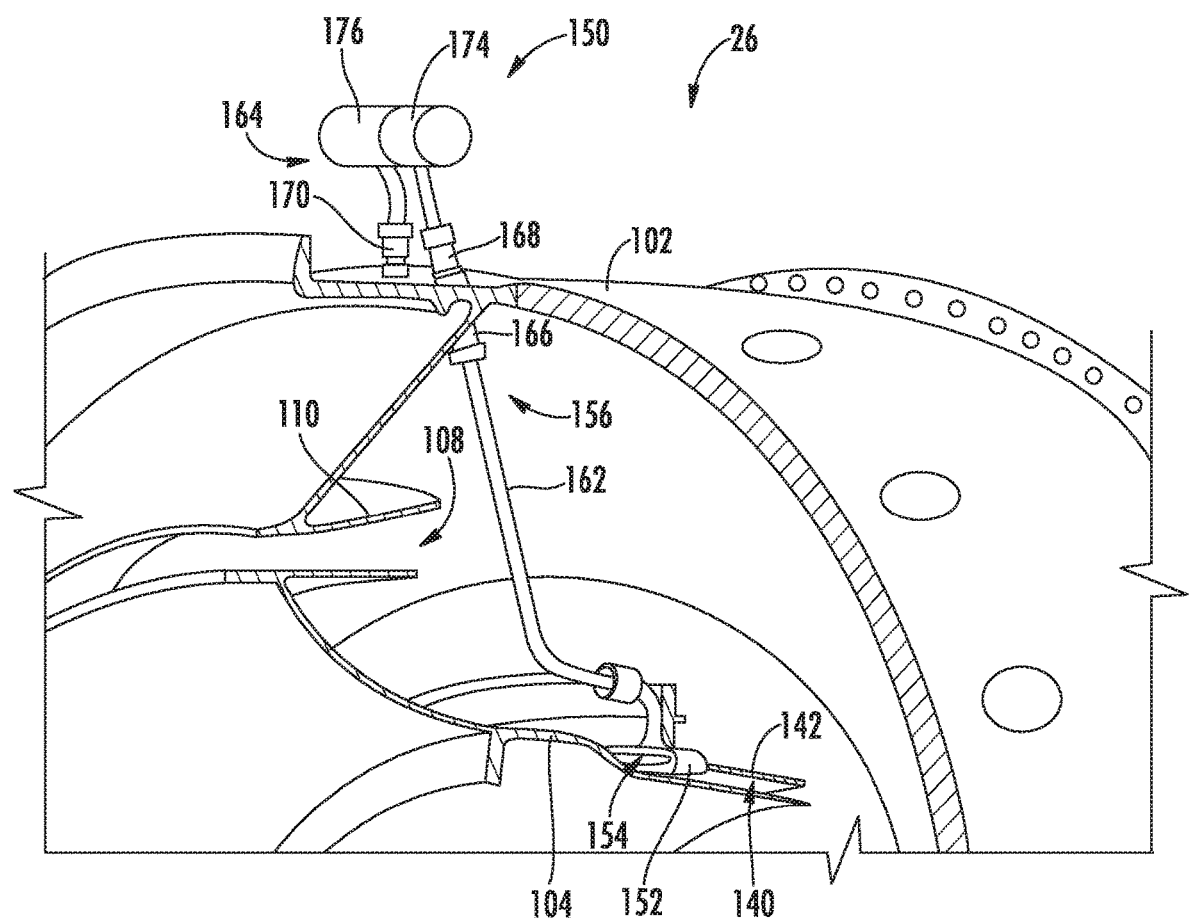
FIG. 3 is a perspective, cutaway view of a portion of the exemplary combustion section depicted in FIG. 2.

Reference will now be made also to FIG. 3, providing a perspective, cutaway view of a portion of the exemplary combustion section 26 of FIG. 2. More specifically, FIG. 3 provides a perspective, cutaway view of the outer combustor casing 102 and inner combustor casing 104, along with the exemplary fluidic nozzle assembly 150 of FIG. 2. As is shown, the exemplary fluidic nozzle assembly 150 further includes a duct assembly 156 in airflow communication with the fluidic nozzle 152. The duct assembly 156 includes a portion extending through the forward chamber 106 defined by the combustion section 26, at a location upstream of the combustion chamber 126, and to the outer combustor casing 102. Further, the duct assembly 156 includes at least a portion extending outside the outer combustor casing 102. Notably, as used herein, the term "outside" with reference to the outer combustor casing 102 refers to a location radially outward of the outer combustor casing 102, relative to the forward chamber 106.

More specifically, for the embodiment depicted, the outer combustor casing 102 defines a first passage 158 and a second passage 160. Additionally, the duct assembly 156 includes a first portion 162 and a second portion 164. The first portion 162 of the duct assembly 156 extends from the fluidic nozzle 152 to the first passage 158 of the outer combustor casing 102, the first portion 162 including a first bracket 166 connecting the first portion 162 of the duct assembly 156 to the outer combustor casing 102 around the first passage 158. The second portion 164 of the duct assembly 156 extends outside the outer combustor casing 102 from the first passage 158 of the outer combustor casing 102 to the second passage 160 of the outer combustor casing 102. The second portion 164 of the duct assembly 156 further includes a second bracket 168 and third bracket 170 for connecting the second portion 164 of the duct assembly 156 to the outer combustor casing 102 around the first and second openings 158, 160, respectively, of the outer combustor casing 102. Notably, however, in other exemplary embodiments, the duct assembly 156 may instead extend continuously through one or both of the first and second passages 158, 160.

Additionally, the duct assembly 156 of the fluidic nozzle assembly 150 defines an inlet 172 for receiving a relatively high pressure airflow. For the exemplary embodiment depicted, the inlet 172 of the duct assembly 156 is defined by the second portion 164 of the duct assembly 156 at the second passage 160 through the outer combustor casing 102 to the forward chamber 106 of the combustion section 26. Accordingly, for the exemplary embodiment depicted, the inlet 172 of the duct assembly 156 is in airflow communication with the forward chamber 106 of the combustion section 26 at a location outward of the compressor outlet 108 of the compressor section along the radial direction R of the turbofan engine 10. Such a configuration may allow for relatively high pressure airflow to be provided to the duct assembly 156 of the fluidic nozzle assembly 150.

Referring still to FIGS. 2 and 3, the exemplary fluidic nozzle assembly 150 depicted further includes a valve 174 for regulating an airflow through the duct assembly 156 and an air filter 176 in airflow communication with the duct assembly 156 for removing at least a portion of any dust or particles from an airflow through the duct assembly 156. For the embodiment depicted, each of the valve 174 and the filter 176 are positioned in airflow communication with the second portion 164 of the duct assembly 156 at a location outside the outer combustor casing 102 along the radial direction R. Such a configuration may make it easier to inspect and/or maintain the fluidic nozzle assembly 150, as the components which will most likely, or most frequently, require repair, replacement, or other maintenance (i.e., the valve 174 and air filter 176) are more conveniently located outside the outer combustor casing 102.

Moreover, as will be described in greater detail below, the valve 174 is movable at least between an open position and a closed position. When in the open position, the valve 174 allows for a flow of pressurized air 184 (i.e., a portion of the compressor discharge air 115; see FIGS. 4 through 6) through the duct assembly 156 to the fluidic nozzle 152, allowing the fluidic nozzle 152 to induce a cooling airflow through the opening 154 of the fluidic nozzle 152. By contrast, however, when the valve 174 is in the closed position, the valve 174 prevents a flow of pressurized air through the duct assembly 156 to the fluidic nozzle 152, preventing the fluidic nozzle 152 from inducing cooling airflow through the opening 154 of the fluidic nozzle 152 (the fluidic nozzle 152 in such an operating mode effectively blocking a portion of an airflow through the cooling air duct 140).

Figure 4:
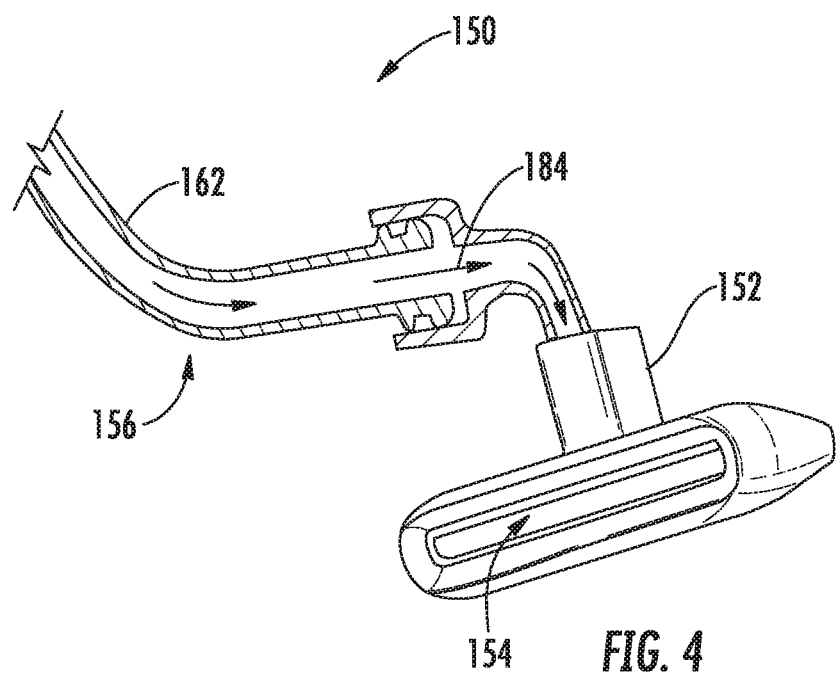
FIG. 4 is a perspective view of a fluidic nozzle of a fluidic nozzle assembly in accordance with an exemplary embodiment of the present disclosure.
Figure 5:
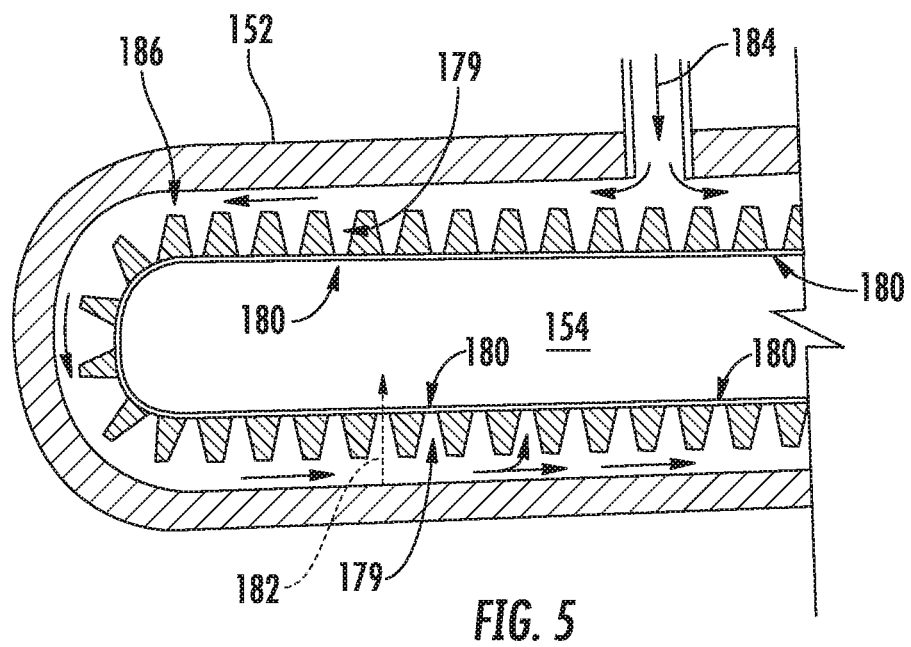
FIG. 5 is a close-up, cross-sectional view of the exemplary fluidic nozzle depicted in FIG. 4 along a width of the exemplary fluidic nozzle.
Figure 6:
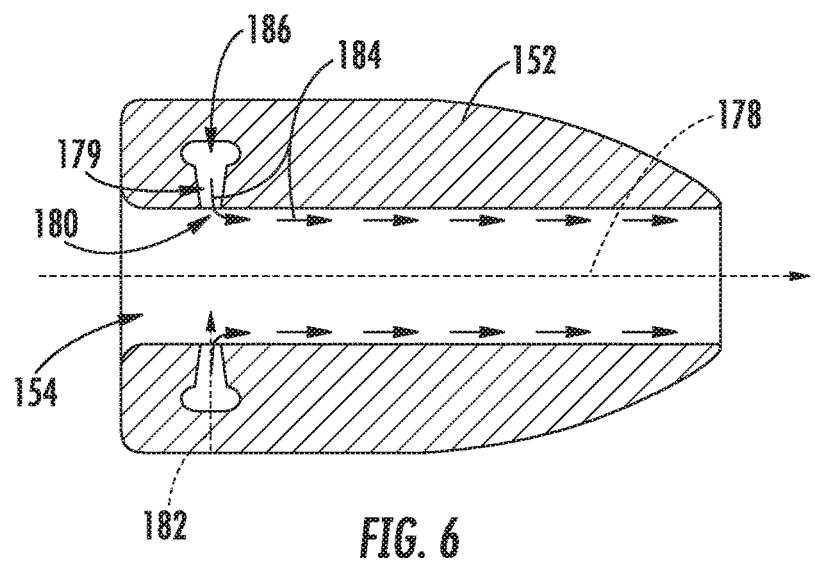
FIG. 6 is a close-up, cross-sectional view of the exemplary fluidic nozzle depicted in FIG. 4 along a length of the exemplary fluidic nozzle.

More specifically, reference will now be made to FIGS. 4 through 6. FIG. 4 provides a perspective view of the exemplary fluidic nozzle 152 of the fluidic nozzle assembly 150; FIG. 5 provides a cross-sectional view of the exemplary fluidic nozzle 152 of the fluidic nozzle assembly 150 across a width of the exemplary fluidic nozzle 152; and FIG. 6 provides a cross-sectional view of the exemplary fluidic nozzle 152 of the fluidic nozzle assembly 150 along a length of the exemplary fluidic nozzle 152. As is shown, for the embodiment depicted the fluidic nozzle 152 defines a relatively elongated opening 154 through which a cooling air from the forward chamber 106 may flow through to the cooling air passage 140 defined by the cooling air inducer 142 of the compressor section. The fluidic nozzle 152 also defines an airflow direction 178 through the opening 154 (i.e., a direction in which the cooling air flows through the opening 154), as may also be seen in FIG. 2.

Moreover, referring particularly to FIGS. 5 and 6, the fluidic nozzle 152 defines a plurality of internal nozzle channels 179, each internal nozzle channel 179 defining a respective internal nozzle outlet 180 positioned around the opening 154 of the fluidic nozzle 152. Each of the plurality of interior nozzle channels 179 and respective internal nozzle outlets 180 are located around the opening 154 in a plane perpendicular to the airflow direction 178 through the opening 154 of the fluidic nozzle 152. The exemplary fluidic nozzle 152 depicted includes at least ten (10) internal nozzle channels 179 positioned around the opening 154. More specifically, the exemplary fluidic nozzle 152 depicted includes at least about twenty (20) internal nozzle channels 179 positioned around the opening 154, such as at least about thirty (30) internal nozzle channels 179 positioned around the opening 154, such as at least about forty (40) internal nozzle channels 179 positioned around the opening 154. It should be appreciated, that as used herein, terms of approximation, such as "about" or "substantially," refer to being within a ten percent (10%) margin.

Referring still particularly to FIGS. 5 and 6, each of the internal nozzle channels 179 defined by the fluidic nozzle 152 defines an airflow direction 182 (i.e., a direction in which the cooling air flows through the internal nozzle channels 179). For the embodiment depicted, the airflow direction 182 of each of the internal nozzle channels 179 is substantially perpendicular to the airflow direction 178 of the opening 154 defined by the fluidic nozzle 152. It should be appreciated, however, that in other exemplary embodiments, each of the internal nozzle channels 179 may instead define any other suitable airflow direction 182 allowing for the fluidic nozzle assembly 150 to function as described herein.

As discussed above, when the valve 174 of the fluidic nozzle assembly 150 is in the open position, the valve 174 is configured to allow a flow of compressed air 184 (i.e., a portion of the compressor discharge air 115) in through the inlet 172 of the duct assembly 156, through the duct assembly 156, and to the fluidic nozzle 152 (see also FIG. 2). The compressed air 184 received by the fluidic nozzle 152 may then be dispersed through a circumferential passage 186 defined in the fluidic nozzle 152 to each of the internal nozzle channels 179 and out the respective internal nozzle outlets 180. The flow of compressed air 184 through each of the internal nozzle channels 179 and respective interior nozzle outlets 180 effectively forms a boundary layer along a length of the opening 154 of the fluidic nozzle 152 (see FIG. 6). The boundary layer formed by the compressed air 184 may induce an additional amount of cooling airflow through the opening 154 of the fluidic nozzle 152. Notably, each of the interior nozzle outlets 180 of the respective interior nozzle channels 179 are positioned around the opening 154 at a forward/upstream end of the opening 154 to form the boundary layer along the length of the opening 154. For example, for the embodiment depicted, each of the interior nozzle outlets 180 are located at a forward twenty percent (20%) of a length of the opening 154 (i.e., a length along the airflow direction 178; see FIG. 6). Accordingly, the fluidic nozzle 152 of the fluidic nozzle assembly 150 is configured to induce cooling airflow through the opening 154 of the fluidic nozzle 152 when the valve 174 of the fluidic nozzle assembly 150 is in the open position.

Notably, by contrast, when the valve 174 of the fluidic nozzle assembly 150 is in the closed position, compressed air is prevented from flowing through the duct assembly 156 to the fluidic nozzle 152, such that the fluidic nozzle 152 does not induce any cooling airflow through the opening 154. Instead, the fluidic nozzle 152 acts to block and reduce an amount of cooling airflow through the cooling air passage 140 defined by the cooling air inducer 142 of the combustion section 26. In this manner, the amount of cooling air provided through the cooling air passage 140 defined by the cooling air inducer 142 of the combustion section 26 may be regulated by moving the valve 174 of the fluidic nozzle assembly 150 between the open position and the closed position, and/or to one or more positions therebetween.

Figure 7:
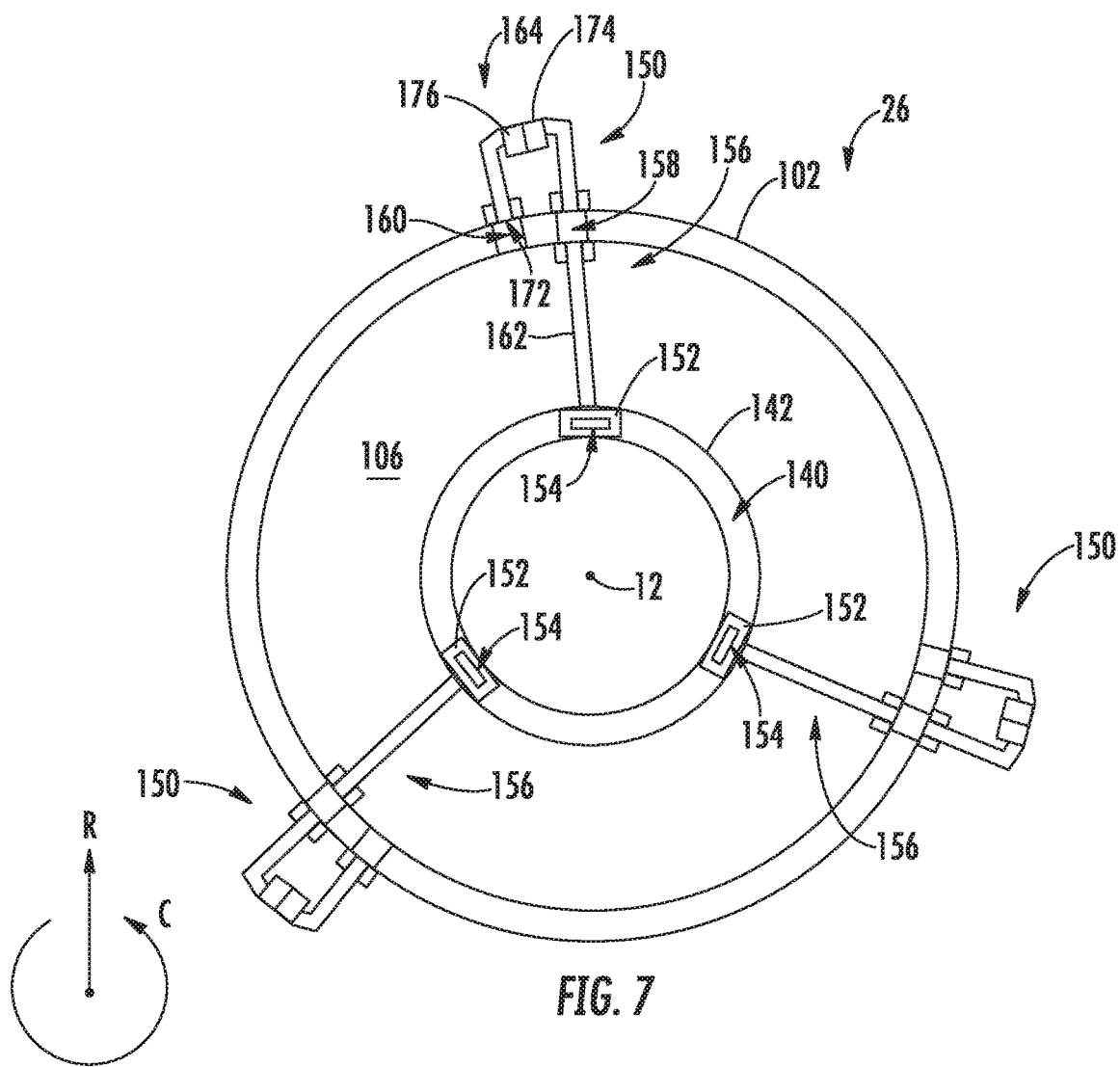
FIG. 7 is a schematic view along an axial direction of a combustion section of a gas turbine engine in accordance with an exemplary embodiment of the present disclosure.

Further, in certain exemplary embodiments, the turbofan engine 10 may additionally include a plurality of fluidic nozzle assemblies 150. For example, referring now briefly to FIG. 7, a schematic view of a combustion section 26 along an axial direction of the gas turbine engine is provided. The combustion section 26 of the gas turbine engine of FIG. 7 may be configured in substantially the same manner as exemplary combustion section 26 of the turbofan engine 10 described above with reference to FIGS. 2 and 3. Accordingly, the same or similar numbers may refer to same or similar part As is depicted, for the exemplary embodiment of FIG. 7, the gas turbine engine includes a plurality of fluidic nozzle assemblies 150, each including a fluidic nozzle 152 positioned in or immediately upstream of a cooling air passage 140 of a combustion section 26 of the gas turbine engine. Further, each fluidic nozzle 152 of the plurality of fluidic nozzle assemblies 150 defines an opening 154 and is operable to induce cooling airflow through the opening 154 during at least certain operations. Moreover, each of the fluidic nozzle assemblies 150 includes a duct assembly 156 in airflow communication with the respective fluidic nozzle 152, and having a portion extending generally radially outward of an outer combustor casing 102. A valve 174 and a filter 176 of each of the fluidic nozzle assemblies 150 are also located radially outward of the outer combustor casing 102. Notably, however, in other exemplary embodiments, the plurality of fluidic nozzle assemblies 150 may share duct assemblies and/or valves, filters, etc.

It should be appreciated, that inclusion of one or more fluidic nozzle assemblies 150 in accordance with one or more exemplary embodiments of the present disclosure may provide for a more efficient gas turbine engine. More specifically, including one or more fluidic nozzle assemblies 150 in accordance with one or more exemplary embodiments of the present disclosure may allow for an amount of cooling airflow provided to one or more stages of turbine rotor blades to be controlled, e.g., based on an operating condition of the gas turbine engine, such as a temperature or expected temperature of such components of the gas turbine engine. By only providing a necessary amount of cooling airflow, an efficiency of the gas turbine engine may be increased by conserving the cooling air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a turbine comprising a stage of turbine rotor blades;
   a combustion section defining a cooling air passage for providing a cooling airflow to the stage of turbine rotor blades, the combustion section further defining a forward chamber upstream of the cooling air passage for providing a flow of compressor discharge air to the cooling air passage; and
   a fluidic nozzle assembly comprising a fluidic nozzle positioned in or immediately upstream of the cooling air passage of the combustion section, the fluidic nozzle defining an opening, wherein a portion of the flow of compressor discharge air flows through the opening as a cooling airflow, and wherein the fluidic nozzle defines an internal nozzle channel for providing a pressurized airflow to the opening to induce the cooling airflow through the opening;
   wherein the gas turbine engine defines a radial direction, wherein the combustion section further defines a combustion chamber and an inducer, and wherein the cooling air passage is a substantially annular passage defined by the inducer, the inducer located inward of the combustion chamber along the radial direction of the gas turbine engine.

2. The gas turbine engine of claim 1, wherein the fluidic nozzle further defines a plurality of internal nozzle channels, and wherein each of the internal nozzle channels defines an internal nozzle outlet positioned around the opening for providing the pressurized airflow to the opening.

3. The gas turbine engine of claim 2, wherein the plurality of internal nozzle channels includes at least ten internal nozzle channels, each having an internal nozzle outlet positioned around the opening for providing the pressurized airflow directly to the opening.

4. The gas turbine engine of claim 2, wherein the opening defined by the fluidic nozzle defines a first airflow direction along which the cooling airflow from the forward chamber flows, wherein each of the plurality of internal nozzle channels defines an airflow direction along which the pressurized airflow flows that is substantially perpendicular to the first airflow direction, the internal nozzle channels providing the pressurized airflow directly to the opening.

5. The gas turbine engine of claim 2, wherein the fluidic nozzle assembly further comprises a duct assembly in airflow communication with the fluidic nozzle and a valve in airflow communication with the duct assembly, wherein the valve is movable between an open position and a closed position, and wherein the fluidic nozzle is configured for providing the pressurized airflow to the plurality of internal nozzle channels and through respective internal nozzle outlets when the valve is in the open position to induce cooling airflow through the opening.

6. The gas turbine engine of claim 1, wherein the combustion section comprises an outer casing, wherein the fluidic nozzle assembly further comprises a duct assembly in airflow communication with the fluidic nozzle, and wherein at least a portion of the duct assembly extends outside the outer casing.

7. The gas turbine engine of claim 6, wherein the gas turbine engine defines a radial direction, wherein the fluidic nozzle assembly further comprises a valve for regulating an airflow through the duct assembly, and wherein the valve is positioned outside the outer casing along the radial direction.

8. The gas turbine engine of claim 1, wherein the gas turbine engine further comprises a compressor defining a compressor outlet, wherein the combustion section further defines a combustion chamber, wherein the forward chamber is positioned upstream of the combustion chamber and in airflow communication with the compressor outlet, wherein the fluidic nozzle assembly further comprises a duct assembly in airflow communication with the fluidic nozzle, wherein the duct assembly defines an inlet, and wherein the inlet is in airflow communication with the forward chamber at a location radially outward of the compressor outlet.

9. The gas turbine engine of claim 1, further comprising:
a plurality of fluidic nozzle assemblies, each fluidic nozzle assembly including a fluidic nozzle positioned in or immediately upstream of the cooling air passage of the combustion section and defining an opening.

10. The gas turbine engine of claim 9, wherein the combustion section further defines a combustion chamber, wherein the cooling air passage is a substantially annular passage extending generally along an axial direction at a location inward of the combustion chamber, wherein the plurality of fluidic nozzles are positioned at a forward end of the cooling air passage.

11. The gas turbine engine of claim 10, wherein the plurality of fluidic nozzles are spaced along a circumferential direction of the gas turbine engine, and wherein the gas turbine engine defines a circumferential gap between the plurality of fluidic nozzles for a portion of the flow of compressor discharge air to flow therethrough.

12. The gas turbine engine of claim 1, wherein the opening defines an inlet, and wherein the internal nozzle channel is in airflow communication with the opening at a location downstream of the inlet of the opening.

13. A fluidic nozzle assembly for a gas turbine engine defining a radial direction and comprising a turbine section including a stage of turbine rotor blades and a combustion section defining a combustion chamber, an inducer, and a forward chamber upstream of a substantially annular cooling air passage for providing a cooling airflow to the stage of turbine rotor blades, the inducer located inward of the combustion chamber along the radial direction of the gas turbine engine, the fluidic nozzle assembly comprising:
a fluidic nozzle positioned in or immediately upstream of the cooling air passage of the combustion section, the fluidic nozzle defining an opening and a plurality of internal nozzle channels, wherein a portion of a flow of compressor discharge air flows through the opening as a cooling airflow, each internal nozzle channel defining an internal nozzle outlet positioned around the opening and providing a pressurized airflow to the opening for inducing the cooling airflow through the opening during certain operations; and
a duct assembly comprising a valve in airflow communication with the plurality of internal nozzle channels of the fluidic nozzle, the duct assembly for providing the pressurized airflow to the plurality of internal nozzle channels, wherein the valve in a closed position prevents the pressurized airflow through the opening.

14. The fluidic nozzle assembly of claim 13, wherein the opening defined by the fluidic nozzle defines an airflow direction, and wherein each of the plurality of internal nozzle channels defines an airflow direction substantially perpendicular to the airflow direction of the opening defined by the fluidic nozzle.

15. The fluidic nozzle assembly of claim 13, wherein the fluidic nozzle assembly further comprises a filter in airflow communication with the duct assembly.

16. The fluidic nozzle assembly of claim 15, wherein the filter is configured to be positioned outside an outer casing of the combustion section of the gas turbine engine along a radial direction of the gas turbine engine.

17. The fluidic nozzle assembly of claim 13, wherein the valve is movable between an open position and the closed position, and wherein the fluidic nozzle is configured for providing a flow of pressurized air to the plurality of internal nozzle channels and through the respective internal nozzle outlets when the valve is in the open position to induce cooling airflow through the opening.

18. A gas turbine engine comprising:
a turbine comprising a stage of turbine rotor blades;
a combustion section defining a cooling air passage for providing a cooling airflow to the stage of turbine rotor blades, the combustion section further defining a forward chamber upstream of the cooling air passage for providing a flow of compressor discharge air to the cooling air passage; and
a fluidic nozzle assembly comprising a fluidic nozzle positioned in or immediately upstream of the cooling air passage of the combustion section, the fluidic nozzle defining an opening, wherein a portion of the flow of compressor discharge air flows through the opening as a cooling airflow, and wherein the fluidic nozzle defines an internal nozzle channel for providing a pressurized airflow to the opening to induce the cooling airflow through the opening;
wherein the combustion section further defines a combustion chamber, wherein the cooling air passage is a substantially annular passage extending generally along an axial direction at a location inward of the combustion chamber, wherein the fluidic nozzle is positioned at a forward end of the cooling air passage.

* * * * *